United States Patent
Dieterich et al.

(10) Patent No.: US 12,312,069 B2
(45) Date of Patent: May 27, 2025

(54) PASSENGER DISCOMFORT-AWARE FLIGHT CONTROL SYSTEM

(71) Applicant: AIRBUS HELICOPTERS DEUTSCHLAND GMBH, Donauworth (DE)

(72) Inventors: Oliver Dieterich, Woerthsee (DE); Christian Fischer, Neuried (DE); Robin Lantzsch, Augsburg (DE); Sueleyman Oezkurt, Leinfelden-Echterdingen (DE); Walter Fichter, Constance (DE); Tobias Rath, Munich (DE)

(73) Assignee: AIRBUS HELICOPTERS DEUTSCHLAND GmbH, Donauworth (DE)

( * ) Notice: Subject to any disclaimer, the term of this patent is extended or adjusted under 35 U.S.C. 154(b) by 274 days.

(21) Appl. No.: 17/946,783

(22) Filed: Sep. 16, 2022

(65) Prior Publication Data

US 2023/0125334 A1  Apr. 27, 2023

(30) Foreign Application Priority Data

Oct. 21, 2021 (EP) .................................... 21400022

(51) Int. Cl.
*B64C 13/38* (2006.01)
*B64C 27/00* (2006.01)
*B64D 47/00* (2006.01)

(52) U.S. Cl.
CPC .............. *B64C 13/38* (2013.01); *B64C 27/00* (2013.01); *B64D 47/00* (2013.01)

(58) Field of Classification Search
CPC .......... B64C 13/38; B64C 27/00; B64D 47/00
See application file for complete search history.

(56) References Cited

U.S. PATENT DOCUMENTS 3,736,880 A * 6/1973 Ross .................... B61F 5/383
  104/282
5,655,878 A * 8/1997 Yamakawa ............ B64C 27/72
  416/114

(Continued)

FOREIGN PATENT DOCUMENTS

DE  102018203898 A1  9/2019
DE  102019115522 A1  12/2020

(Continued)

OTHER PUBLICATIONS

English translation of KR 20210019661 A (Year: 2021).*

(Continued)

*Primary Examiner* — Navid Z. Mehdizadeh
*Assistant Examiner* — Matthew Ho
(74) *Attorney, Agent, or Firm* — Brooks Kushman P.C.

(57) ABSTRACT

A flight control system that is adapted for controlling movements of a rotary wing aircraft while considering passenger discomfort, to a rotary wing aircraft with such a flight control system, and to a method of operating a flight control system. The flight control system includes sensors configured to generate sensor data based on captured motions of the rotary wing aircraft, motion actuators that are adapted for inducing a translational and/or a rotational movement of the rotary wing aircraft about at least one of a yaw axis, a roll axis, or a pitch axis, and a passenger discomfort-aware control unit that is configured to generate, based on the sensor data, passenger discomfort-aware actuator control signals for controlling the motion actuators of the rotary wing aircraft.

12 Claims, 7 Drawing Sheets

(56) References Cited

U.S. PATENT DOCUMENTS

| | | | |
|---|---|---|---|
| 2005/0240326 A1* | 10/2005 | Lauwerys | B60G 17/018 |
| | | | 280/5.5 |
| 2015/0375857 A1* | 12/2015 | Swanson | B64C 27/001 |
| | | | 701/3 |
| 2017/0243505 A1* | 8/2017 | Dimock | G09B 9/12 |
| 2020/0317089 A1 | 10/2020 | Friedrich | |
| 2021/0009009 A1 | 1/2021 | Geiger et al. | |
| 2022/0219705 A1 | 7/2022 | Bohrmann | |

FOREIGN PATENT DOCUMENTS

| | | | |
|---|---|---|---|
| KR | 20210019661 A | * | 2/2021 |
| WO | 9621497 A1 | | 7/1996 |
| WO | 2019120360 A1 | | 6/2019 |
| WO | 2019120381 A1 | | 6/2019 |
| WO | 2020229389 A1 | | 11/2020 |

OTHER PUBLICATIONS

European Search Report for European Application No. EP 21400022.6, Completed by the European Patent Office, Dated Mar. 7, 2022, 7 pages.

* cited by examiner

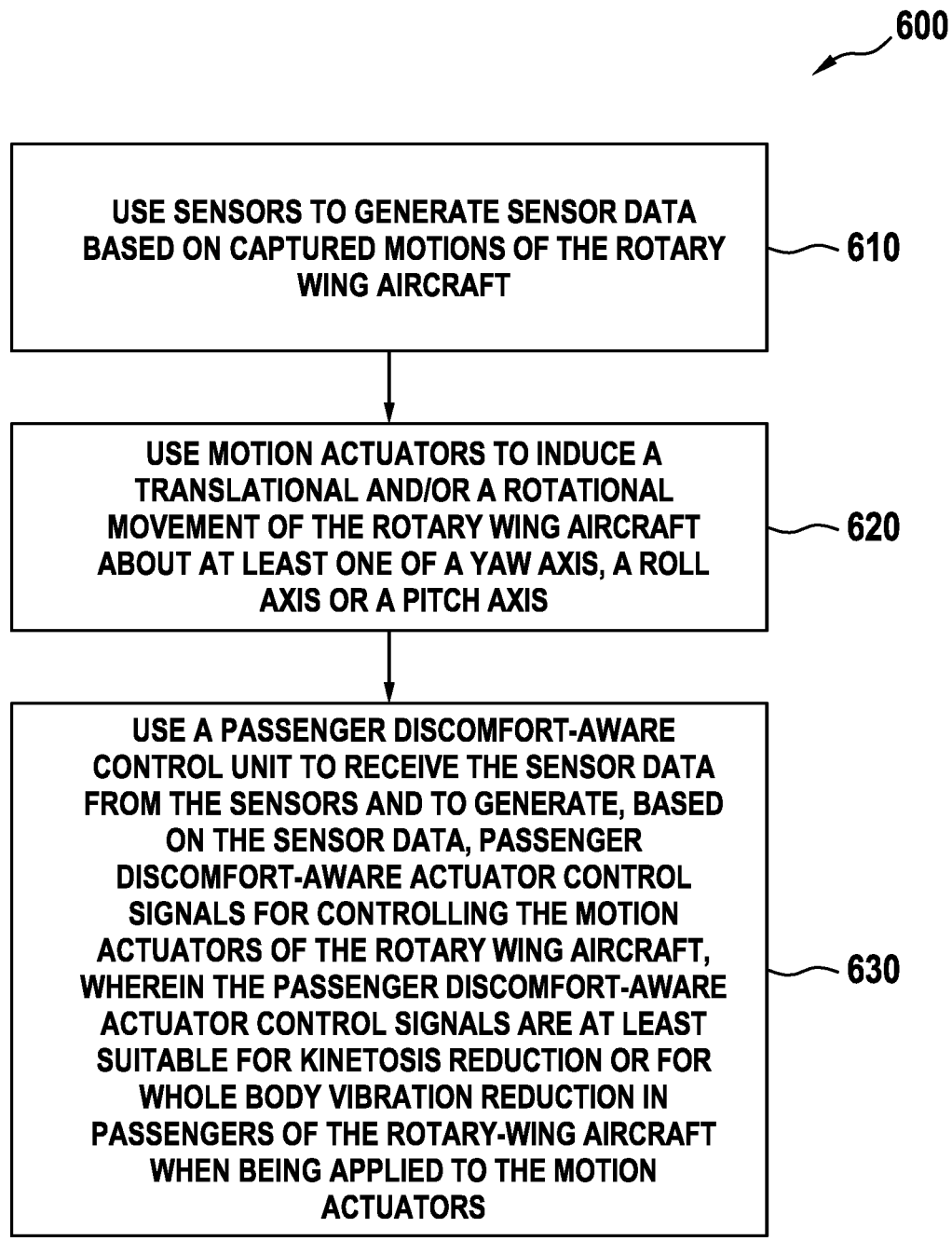

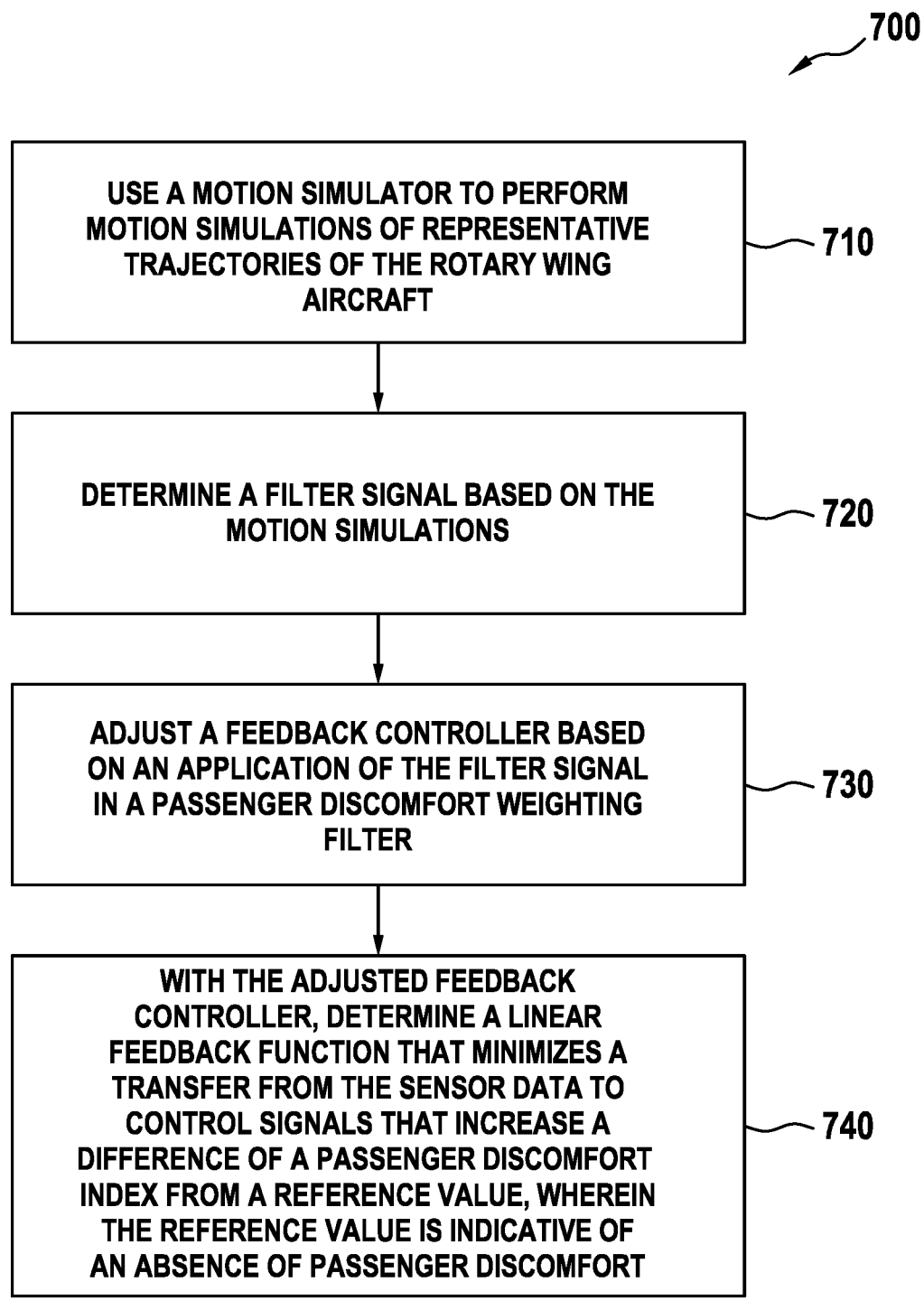

PASSENGER DISCOMFORT-AWARE FLIGHT CONTROL SYSTEM

CROSS-REFERENCE TO RELATED APPLICATIONS

This application claims priority to European patent application No. EP 21400022.6 filed on Oct. 21, 2021, the disclosure of which is incorporated in its entirety by reference herein.

TECHNICAL FIELD

The present technology relates to a flight control system for controlling an aircraft, and, more particularly, to a flight control system that is adapted for controlling movements of a rotary wing aircraft while considering passenger discomfort. The present technology further relates to a rotary wing aircraft with such a flight control system and to a method of operating a flight control system for a rotary wing aircraft.

BACKGROUND

Flight control systems may be used in any aircraft. For example, flight control systems are used in airplanes, helicopters, vertical take-off and landing (VTOL) vehicles etc. Flight control systems may also be used in spacecraft, if desired.

Flight control systems are usually required to provide a high control accuracy to fulfill the mission of the aircraft from a flight dynamics' perspective. Conventional flight control systems also provide control inputs to primary flight actuators based on sensor data that measures motions of the aircraft.

Atmospheric turbulences such as wind gusts may cause flight disturbances. Flight control systems have to react promptly to such flight disturbances to ensure the safety of the aircraft and all passengers onboard the aircraft.

A quick and pronounced reaction of the flight control system to external disturbances is desirable for high control accuracy, and a high control power is typically applied to ensure a quick response of the aircraft. Flight control systems that apply a high control power often cause very "noisy" flights in gusty environments due to the response of the flight control system when the vehicle experiences deviations from the target control objectives.

Noisy flights are characterized by sudden movements of the aircraft. These sudden movements of the aircraft are transferred via contact surfaces such as seat pan, seat backrest, and cabin floor in form of mechanical vibrations to passengers of the aircraft. In the context of the present application, the term passenger is meant to include all human beings onboard the aircraft including the flight deck crew, the cabin crew, and other personnel onboard the aircraft as well as any transported persons.

The mechanical vibrations from the contact surfaces can be internally reinforced by human body resonances hereby impacting e.g., head and neck, abdomen, skeletal musculature, and the pelvic-perineal complex. Effects of long-term high-intensity whole-body vibrations indicates an increased health risk of the lumbar spine and the connected nervous system.

The standard ISO 2631-1:1997 about mechanical vibration and shock evaluates human exposure to whole-body vibration and defines how to measure human whole-body vibration, for example as experienced by passengers during a flight. ISO 2631-1:1997 also provides information on the possible effects of vibration on health, comfort and perception, and on the incidence of motion sickness in annexes B, C, and D, respectively.

Motion sickness, which is sometimes also referred to as kinetosis, was first experienced with respect to sea travel; in view of air travel this phenomenon is also labelled as air sickness. Motion sickness or kinetosis is related to a difference between actual and expected motion. In the sensory conflict theory, kinetosis occurs when the vestibular system and the visual system do not present a synchronized and unified perception. Symptoms of kinetosis commonly include cold sweat, nausea, and vomiting in the extreme case.

Documents WO 2019/120360 A1 and WO 2019/120381 A1 describe a system for reducing motion sickness symptoms for a vehicle, wherein the system has a control unit which is coupled to a sensor system and/or to a navigation system, to a vehicle seat system, to a vehicle stabilization device and to a display unit for receiving and/or emitting signals. The sensor system and the navigation system are set up to receive environmental data and/or vehicle component data relating to the vehicle, from which movements of the vehicle result, and to transfer said data to the control unit. The control unit is set up to generate vehicle stabilization signals, seat adjustment signals and display signals on the basis of the received environmental data and/or vehicle component data.

Document DE 10 2018 203898 A1 describes a travel planning system for a vehicle, the system comprising a determination device, an occupant device, and a control unit coupled to the determination device and the occupant device. The determination device is designed to determine whether there is a risk of kinesis for a driving maneuver and/or a driving route. The occupant device is designed to determine whether a kinetic susceptibility of at least one vehicle occupant is present. The control unit is designed to execute the journey planning of the vehicle as a function of the determined kinetic risk for the driving maneuver and/or the route and of the determined susceptibility to kinesis and to output this to a travel planning device coupled to the control unit.

Document DE 10 2019 115522 A1 describes a method for avoiding kinetosis and/or boredom for a vehicle, the method comprising determining a risk of kinetosis and/or boredom. Determining a risk of kinetosis and/or boredom comprises at least one of the following actions: determining a risk of kinetosis and/or boredom for a driving maneuver and/or a route of the vehicle; Determining a kinetosis and/or boredom sign in at least one vehicle occupant; Determination of a risk of kinetosis and/or boredom for an activity carried out by a vehicle occupant. The method further comprises activating a kinetosis and/or boredom avoidance function if a risk of kinetosis and/or boredom is determined. The kinetosis and/or boredom avoidance function is designed in such a way that it draws the attention of at least one vehicle occupant to a specific object and/or a specific activity.

Document WO 2020/229389 A1 describes a method for predicting and reducing motion sickness-related impairments of an occupant during the driving operation of a vehicle, wherein the occupant is captured at least by means of a vehicle camera. According to the document, provision is made for—a characteristic specifying the probability of the onset of motion sickness-related impairments to be ascertained on the basis of stimuli acting on the occupant, an individual susceptibility of the occupant to motion sickness and a type of activity carried out during the driving operation, and—on the basis of the ascertained characteristic, at least one individual measure from a catalogue of measures for preventing motion sickness-related impairments to be recommended to the occupant or automatically induced.

Thus, documents DE 10 2019 115522 A1 and WO 2020/229389 A1 propose actions that target the occupant of a vehicle: While the former draws the attention of the occupant to a specific object and/or a specific activity, the latter suggests a catalogue of measures to the occupant.

However, none of the above documents describe a controller that is designed to improve the comfort of a flight for the passengers of an aircraft by acting on the flight controls of the aircraft such that passenger discomfort is avoided or at least reduced compared to conventional flight controls.

Furthermore, the application range of the standard ISO 2631-1 for whole-body vibrations refers to transportation systems in general. Potential of improvement exists when focusing on rotorcraft applications due to the special excitation signature with embedded tonal components. For example, filters and procedures can be modified in order to cover beating phenomena in addition.

SUMMARY

It is, therefore, an objective to provide a new flight control system for controlling an aircraft that overcomes the above described shortcomings. The new flight control system should be designed to take passenger discomfort causing actuator control signals into account such that passenger discomfort can be avoided or at least reduced. Further objectives relate to providing a rotary wing aircraft with such a new flight control system and to providing a method of operating a new flight control system.

The objective is solved by a flight control system comprising the features of claim 1, by a rotary wing aircraft comprising the features of claim 8, and by a method of operating a flight control system, the method comprising the features of claim 9. More specifically, a flight control system that is adapted for controlling movements of a rotary wing aircraft, comprises sensors that are configured to generate sensor data based on captured motions of the rotary wing aircraft; motion actuators that are adapted for inducing a translational and/or a rotational movement of the rotary wing aircraft about at least one of a yaw axis, a roll axis, or a pitch axis; and a passenger discomfort-aware control unit that is configured to receive the sensor data from the sensors and to generate, based on the sensor data, passenger discomfort-aware actuator control signals for controlling the motion actuators of the rotary wing aircraft, wherein the passenger discomfort-aware actuator control signals are at least suitable for kinetosis reduction or for whole-body vibration reduction in passengers of the rotary-wing aircraft when being applied to the motion actuators.

Illustratively, the flight control system design considers motion sickness characteristics and/or whole-body vibrations in a formalized manner for improved comfort of ride. Motion sickness characteristics and/or whole-body vibrations are based on motion platform tests using representative rotary wing aircraft trajectories.

Human sensitivity on motions may be described by weighting filters: High gains of the weighting filters correspond to high sensitivity/high impact of motions i.e., inputs to the filters on comfort feeling of the occupants. The gains significantly depend on the frequencies of the motions, and the weighting considers the kind of motions, which may include translations and rotations and the various spatial axes in order to represent human perception the best possible.

The weighting filters may be derived from experimental tests on motion platforms, if desired. Such experimental tests may expose test persons to dedicated test trajectories. Illustratively, the test trajectories may be derived from flight testing.

By way of example, the weighting filters may be implemented in the automatic flight control system (AFCS) feedback design approach providing as output a passenger discomfort index when the closed loop plant model is excited by turbulence models fed with white noise. The passenger discomfort index may include a component that is based on kinetosis and/or a component that is based on whole-body vibration.

The passenger discomfort index represents the quantity which needs to be minimized for improving ride quality in the AFCS design. A low passenger discomfort index represents a configuration with low sensitivity to gust-like excitations as the controlled aircraft tries to respond in motion patterns and at frequencies less susceptible for passenger discomfort.

The implementation of the hereby optimized AFCS design into an aircraft may cause the flight control system to respond to atmospheric turbulence in frequencies and motion patterns which are expected to lead to less passenger discomfort, thereby improving the ride quality.

Illustratively, the flight control system design considers aspects that lead to improved passenger comfort. For example, less actuation power may be assigned by the flight control system to frequencies and vehicle motions which can provoke passenger discomfort, especially in gusty flight conditions.

The formalized consideration of ride quality aspects for the AFCS design could lead to faster and more reproducible results as the human factor is eliminated from the optimization loop and only used for final validation.

Furthermore, the dependency on special atmospheric conditions such as gusts for adequately assessing the feedback characteristics of the flight control system are at least reduced which could have positive benefit for flight testing.

Moreover, the technology provides design procedures that can be further refined or adapted to special needs and objectives. For example, the flight control system design may trade off ride quality for other requirements which e.g., could be mission dependent.

According to one aspect, the passenger discomfort-aware control unit generates the passenger discomfort-aware actuator control signals based on a linear feedback function that minimizes a transfer from the sensor data to control signals that increase a difference of a passenger discomfort index from a reference value, wherein the reference value is indicative of an absence of passenger discomfort.

According to one aspect, the linear feedback function is determined with a feedback controller that is adjusted based on an application of a predetermined filter signal in a passenger discomfort weighting filter.

According to one aspect, the predetermined filter signal is determined based on motion simulations of representative trajectories of the rotary wing aircraft with a motion simulator for flight control system design.

According to one aspect, the representative trajectories of the rotary wing aircraft comprise translational motions and rotational motions about the yaw, roll, and pitch axis.

According to one aspect, the predetermined filter signal adjusts a motion frequency in the feedback controller.

According to one aspect, the predetermined filter signal adjusts a motion pattern in the feedback controller.

Furthermore, a rotary wing aircraft may comprise the flight control system mentioned above.

Moreover, a method of operating a flight control system for a rotary wing aircraft, comprises: using sensors to generate sensor data based on captured motions of the rotary wing aircraft; using motion actuators to induce a translational and/or a rotational movement of the rotary wing aircraft about at least one of a yaw axis, a roll axis, or a pitch axis; and using a passenger discomfort-aware control unit to receive the sensor data from the sensors and to generate, based on the sensor data, passenger discomfort-aware actuator control signals for controlling the motion actuators of the rotary wing aircraft, wherein the passenger discomfort-aware actuator control signals are at least suitable for kinetosis reduction or for whole-body vibration reduction in passengers of the rotary-wing aircraft when being applied to the motion actuators.

According to one aspect, the method further comprises configuring the passenger discomfort-aware control unit before using the passenger discomfort-aware control unit in the flight control system.

According to one aspect, configuring the passenger discomfort-aware control unit further comprises: using a motion simulator to perform motion simulations of representative trajectories of the rotary wing aircraft; and determining a filter signal based on the motion simulations.

According to one aspect, the representative trajectories of the rotary wing aircraft comprise translational motions and rotational motions around the yaw, roll, and pitch axes of the rotary wing aircraft.

According to one aspect, configuring the passenger discomfort-aware control unit further comprises: adjusting a feedback controller based on an application of the filter signal in a passenger discomfort weighting filter; and with the adjusted feedback controller, determining a linear feedback function that minimizes a transfer from the sensor data to control signals that increase a difference of a passenger discomfort index from a reference value, wherein the reference value is indicative of an absence of passenger discomfort.

According to one aspect, adjusting the feedback controller further comprises: with the filter signal, adjusting a motion frequency in the feedback controller.

According to one aspect, adjusting the feedback controller further comprises: with the filter signal, adjusting a motion pattern in the feedback controller.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

FIG. 6 is a diagram of a flowchart showing illustrative operations that a flight control system may perform to control a rotary wing aircraft in accordance with some embodiments; and FIG. 7 is a diagram of a flowchart showing illustrative operations for configuring a passenger discomfort-aware control unit during a flight control system design in accordance with some embodiments.

DETAILED DESCRIPTION

Figure 1:
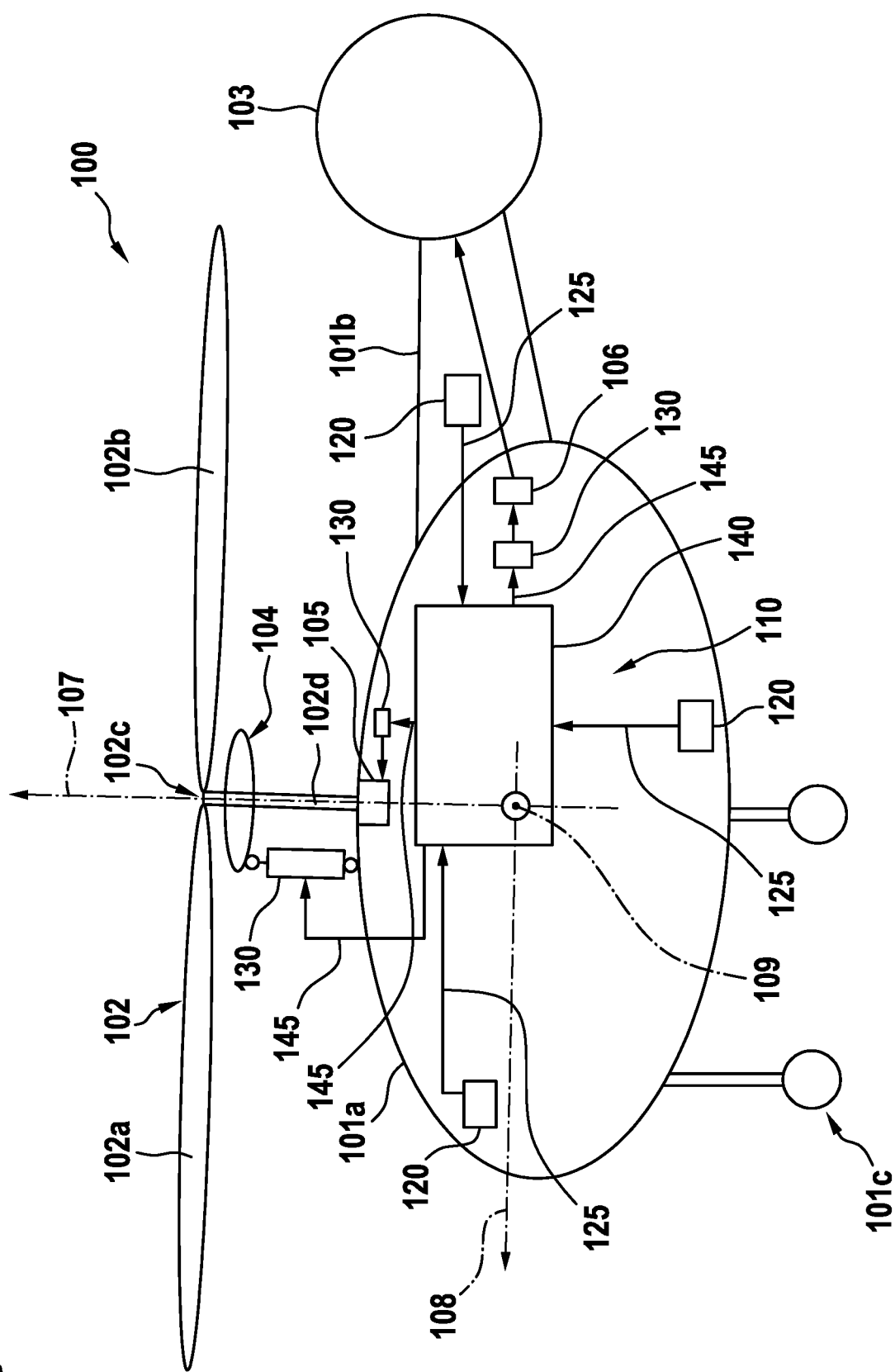
FIG. 1 is a diagram of an illustrative rotary wing aircraft with a flight control system in accordance with some embodiments.

FIG. 1 shows an aircraft, and, in particular, a rotary wing aircraft 100 that is exemplarily illustrated as a helicopter. Thus, for purposes of simplicity and clarity, the rotary wing aircraft 100 may hereinafter also be referred to as the "helicopter" 100. It should, however, be noted that the present embodiments are not limited to helicopters and can likewise be applied to any other rotary wing aircraft and to any other aircraft in general, independent of a particular configuration thereof.

Illustratively, helicopter 100 comprises fuselage 101a that is connected to a landing gear 101c, which is embodied as a wheel-type landing gear by way of example, and defines a tail boom 101b. The wheel-type landing gear could also be replaced by skids or other designs, if desired. The helicopter 100 further comprises at least one main rotor 102 for providing lift and forward, backward or sideward thrust during operation.

The main rotor 102 is exemplarily embodied as a multi-blade main rotor that comprises a plurality of rotor blades 102a, 102b that are mounted at an associated rotor head 102c to a rotor mast 102d, which rotates in operation of the helicopter 100 around an associated rotor axis defined by the rotor mast 102d.

By way of example, the helicopter 100 further comprises at least one counter-torque device 103 configured to provide counter-torque during operation, i.e., to counter the torque created by rotation of the at least one multi-blade main rotor 102 for purposes of balancing the helicopter 100 in terms of yaw. The at least one counter-torque device 103 is illustratively implemented by a tail rotor at an aft section of the tail boom 101b, and therefore also referred to as the "tail rotor" 103 hereinafter.

Illustratively, the helicopter may include a main rotor drive system 105 and a tail rotor drive system 106. The drive systems 105, 106 may include an engine, a gearbox, a drive shaft, etc. Drive systems are well-known to the person skilled in the art. Therefore, a detailed description of the drive systems 105, 106 is omitted for brevity and conciseness.

As shown in FIG. 1, the helicopter 100 includes a flight control system 110. The flight control system 110 is adapted for controlling movements of the helicopter 100 and includes sensors 120, motion actuators 130, and a passenger discomfort aware control unit 140.

The described technology reduces passenger discomfort evoked by inadequate motions of the helicopter 100 up to the bandwidth of the flight control system 110. If desired, the described technology may reduce kinetosis and/or whole-body vibrations in passengers of the helicopter 100.

Discomfort created by motion can be quantified by different measures. As an example, the motions can be weighted (i.e., filtered) based on filtering of measured physical motions. As another example, motion dose values may be obtained by integration of filtered motions versus time.

The motion dose values consider the duration of the exposure. In contrast thereto, in the standard ISO 2631-1, motions are typically considered as accelerations.

The sensors 120 are configured to generate sensor data 125 based on captured motions of the helicopter 100. As an example, the sensors 120 may capture speed of the helicopter 100 relative to the ground or relative to the surrounding air. As another example, the sensors 120 may capture deviations from a vertical plane formed by yaw axis 107 and pitch axis 109 at a first time versus the vertical plane formed by yaw axis 107 and pitch axis 109 at a second time or deviations from a horizontal plane formed by roll axis 108 and pitch axis 109 at a first time versus the horizontal plane formed by roll axis 108 and pitch axis 109 at a second time. As yet another example, the sensors 120 may capture current control information such as the revolutions per minute (rpm) of the main rotor 102 and the tail rotor 103, the collective and cyclic pitch angle of the rotor blades 102a, 102b of the main rotor 102, etc.

The motion actuators 130 are adapted for inducing a translational and/or a rotational movement of the rotary wing aircraft 100 about at least one of a yaw axis 107, a roll axis 108, or a pitch axis 109.

As an example of a motion actuator 130, the helicopter 100 may include a pitch control unit 104 for controlling collective and cyclic pitch of the rotor blades 102a, 102b of the at least one multi-blade main rotor 102 in operation. This pitch control unit 104 may be arranged between the rotor head 102c and the fuselage 101a of the helicopter 100 and may be implemented by means of a swash plate assembly.

It should be noted that a suitable swash plate assembly that can be used for realizing the pitch control unit 104 and its functionality are well-known to the person skilled in the art. Therefore, a detailed description of the pitch control unit 104, i.e., the swash plate assembly, is omitted for brevity and conciseness.

If desired, the motion actuator 130 may include other actuators that adjust engine throttle, gearbox settings, etc. For example, electrical VTOL vehicles may use rotational speed changes of rotors and/or propellers for flight control.

The passenger discomfort-aware control unit 140 is configured to generate passenger discomfort-aware actuator control signals 145 for controlling the motion actuators 130 of the rotary wing aircraft 100. The passenger discomfort-aware actuator control signals 145 are at least suitable for kinetosis reduction or for whole-body vibration reduction in passengers of the rotary-wing aircraft 100 when being applied to the motion actuators 130.

As an example, compared to conventional actuator control signals, the passenger discomfort-aware actuator control signals 145 are suitable for kinetosis reduction in passengers of the rotary wing aircraft 100 when being applied to the motion actuators 130. As another example, compared to conventional actuator control signals, the passenger discomfort-aware actuator control signals 145 are suitable for whole-body vibration reduction in passengers of the rotary wing aircraft 100 when being applied to the motion actuators 130. As yet another example, compared to conventional actuator control signals, the passenger discomfort-aware actuator control signals 145 may be suitable at least for both, kinetosis and whole-body vibration reduction in passengers of the rotary wing aircraft when being applied to the motion actuators 130.

Preferably, the passenger discomfort-aware actuator control signals 145 are suitable for kinetosis avoidance in a predetermined portion of passengers of a rotary wing aircraft 100 when being applied to the motion actuators 130 under predetermined flight conditions. If desired, the passenger discomfort-aware actuator control signals 145 are suitable for whole-body vibration reduction below a predetermined threshold in passengers of a rotary wing aircraft 100 when being applied to the motion actuators 130 under predetermined flight conditions.

For example, during the design of a flight control system 110, both effects can be considered by application of filters in the design loop, whereby the filters can feature high gains in the frequency ranges with high impact on human discomfort.

As an example, a kinetosis-aware feedback controller may consider kinetosis weighting filters in the design loop. As another example, a whole-body vibration (WBV) aware feedback controller may consider WBV weighting filters in the design loop. As yet another example, a kinetosis and whole-body vibration aware feedback controller may consider both kind of weighting filters in the design loop.

Figure 2:
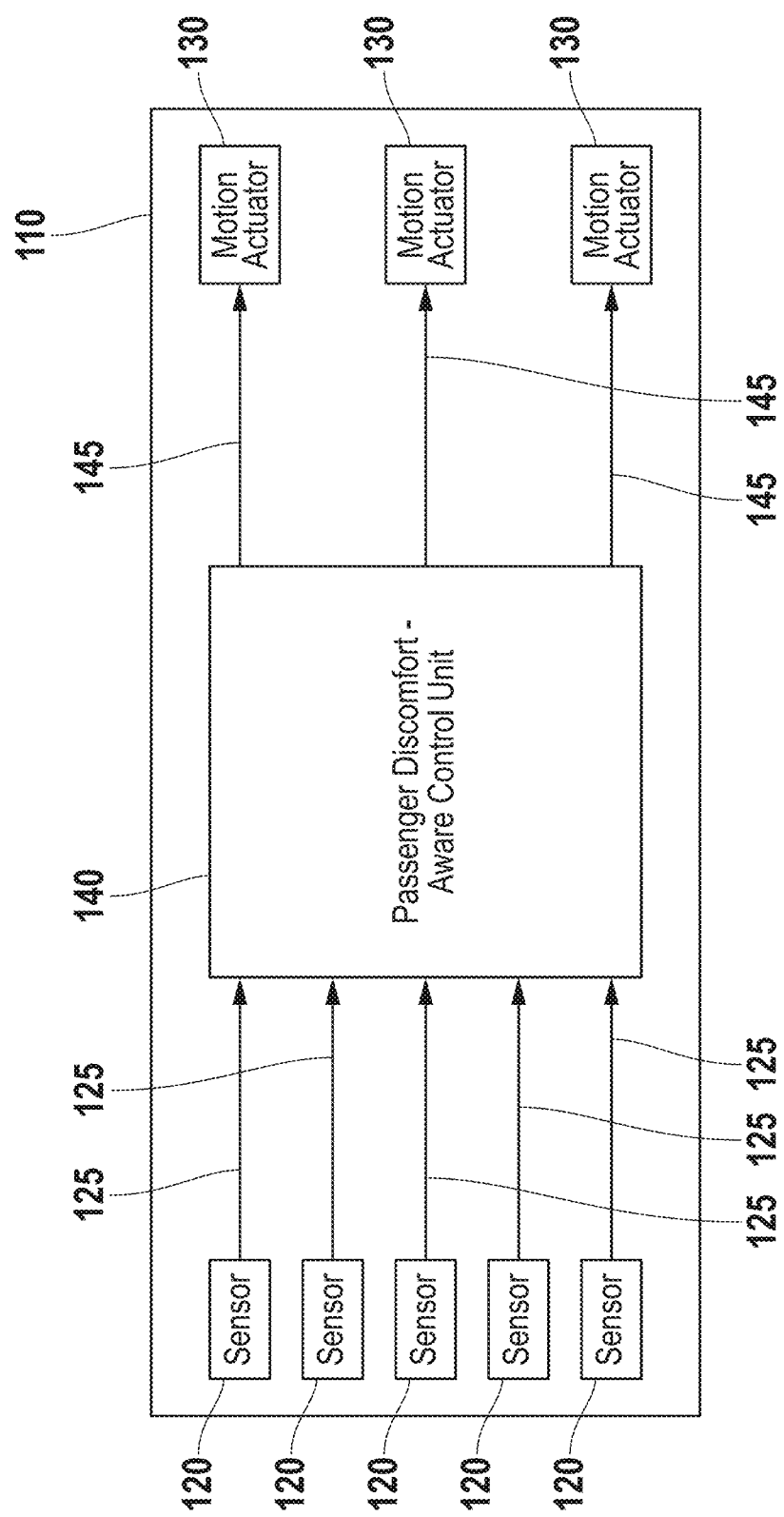
FIG. 2 is a diagram of an illustrative flight control system with a passenger discomfort-aware control unit in accordance with some embodiments.

FIG. 2 is a diagram of an illustrative flight control system 110 with a passenger discomfort-aware control unit 140. As shown in FIG. 2, the passenger discomfort-aware control unit 140 is configured to receive sensor data 125 from sensors 120 and to generate, based on the sensor data 125, passenger discomfort-aware actuator control signals 145 for controlling the motion actuators 130 of the rotary wing aircraft 100. The passenger discomfort-aware actuator control signals 145 are at least suitable for kinetosis reduction or for whole-body vibration reduction in passengers of the rotary-wing aircraft 100 when being applied to the motion actuators 130.

Passenger discomfort usually occurs when the bandwidth and/or activities of the control signals 145 from the control unit 140 overlap with the frequency range of high human sensitivity to kinetosis and/or lead to significant whole-body vibrations or when the control signals 145 generated by the control system 140 causes patterns of vehicle motions (e.g., high amount of rotations) that are known to provoking kinetosis and/or whole-body vibrations.

The design of flight control system 110, and, more particularly, the design of the passenger discomfort-aware control unit 140 explicitly considers comfort of ride requirements such as kinetosis and/or whole-body vibrations, while maintaining a high control accuracy at the same time.

Illustratively, the passenger discomfort-aware control unit 140 may generate passenger discomfort-aware actuator control signals 145 based on a linear feedback function that minimizes a transfer from the sensor data 125 to control signals 145 that increase a difference of a passenger discomfort index from a reference value, whereby the reference value is indicative of an absence of passenger discomfort.

In other words, the difference of the passenger discomfort index from the reference value represents the quantity which needs to be minimized in the AFCS design for improving the ride quality of passengers. A comparably small difference of the passenger discomfort index from the reference value represents a configuration with low sensitivity to gust-like excitations as the controlled aircraft tries to respond in motion patterns and at frequencies less susceptible for passenger discomfort.

By way of example, the linear feedback function may be determined with a feedback controller that is adjusted based on an application of a predetermined filter signal in a passenger discomfort weighting filter.

Figure 3:
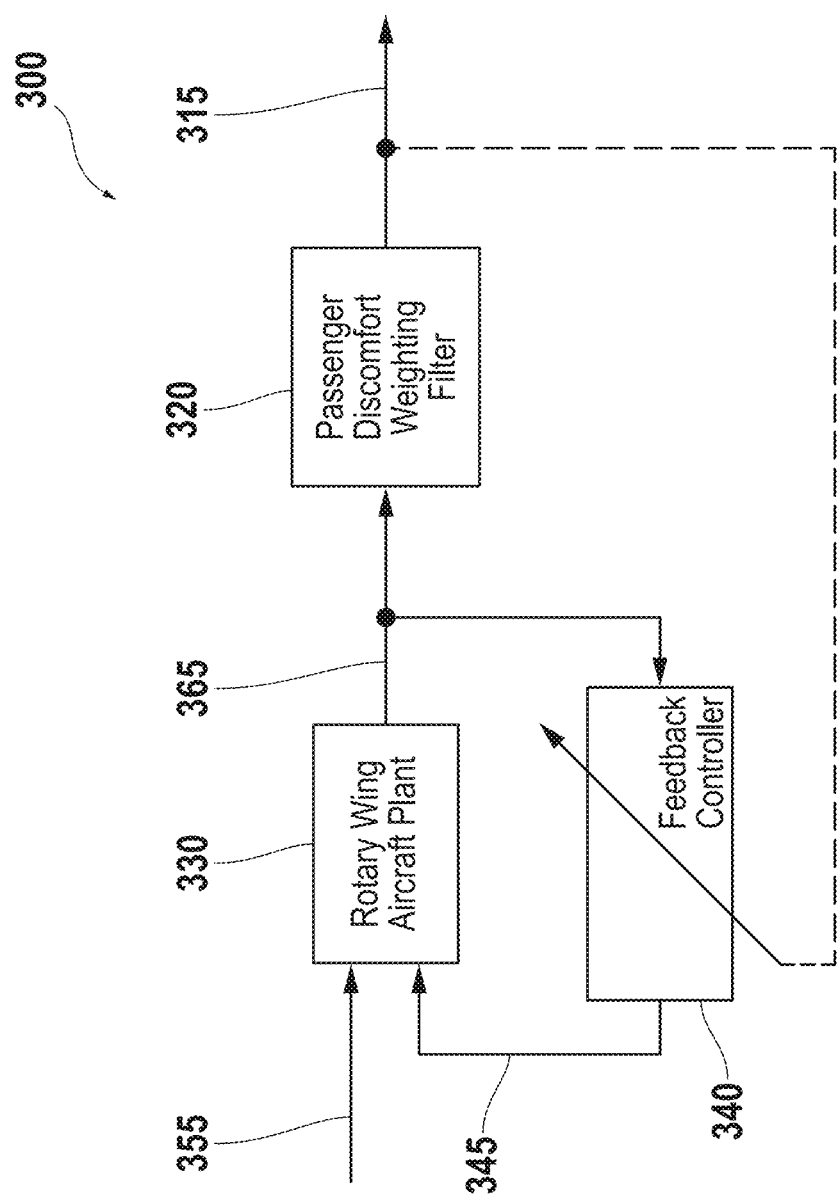
FIG. 3 is a diagram of an illustrative flight control system design with an adjustable feedback controller in accordance with some embodiments.

FIG. 3 is a diagram of an illustrative flight control system design 300 with an adjustable feedback controller 340.

Illustratively, a rotary wing aircraft plant 330 may receive a modeled disturbance input 355. The modeled disturbance input 355 may be provided by a turbulence model that simulates turbulence by applying noise coloring filters to a standard Gaussian white noise disturbance input.

The rotary wing aircraft plant 330 may react to the modeled disturbance input 355 with translational and/or rotatory motions, provided as modeled sensor data 365. A passenger discomfort-aware filter 320 may receive the modeled sensor data 365, apply a predetermined filter signal to the modeled sensor data 365 to produce a passenger discomfort index 315.

As an example, the predetermined filter signal may adjust a motion frequency in the feedback controller 340. As another example, the predetermined filter signal may adjust a motion pattern in the feedback controller 340.

By way of example, the rotary wing aircraft plant 330 may be controlled by an adjustable feedback controller 340 in a feedback loop. The adjustable feedback controller 340 may be adjusted based on the passenger discomfort index 315 and provide modeled actuator control signals 345 to the rotary wing aircraft plant 330.

By linking the modeled disturbance input 355, the rotary wing aircraft plant 330, the feedback controller 340, the passenger discomfort weighting filter 320, and the passenger discomfort index 315, a transfer function from the modeled disturbance input 355 to the passenger discomfort index 315 may be analytically determined as a function of the feedback controller 340.

Illustratively, formal design procedures may be suitable to finding an optimal linear feedback that minimizes the transfer from the modeled disturbance input 355 to the passenger discomfort index 315 with respect to an appropriate system norm, like H2 or H∞.

It should be noted that formal design procedures for finding an optimal linear feedback that minimizes a transfer from an input to an output of a feedback system are well-known to the person skilled in the art. Therefore, a detailed description of such formal design procedures is omitted for brevity and conciseness.

The output of the flight control system design 300 may be the adjusted feedback controller 340 as a mathematical dynamic system, that serves in the passenger discomfort-aware control unit 140 of FIG. 2 to generate, based on the sensor data 125, passenger discomfort-aware actuator control signals 145 for controlling the motion actuators 130 of the rotary wing aircraft, wherein the passenger discomfort-aware actuator control signals 145 are at least suitable for kinetosis reduction or for whole-body vibration reduction in passengers of the rotary-wing aircraft when being applied to the motion actuators 130.

Thus, passenger discomfort is explicitly considered during the flight control system design 300 such that the passenger discomfort-aware control unit 140 of FIG. 2 is implicitly able to avoid generating control signals 145 for the motion actuators 130 that would provoke passenger discomfort.

Figure 4A:
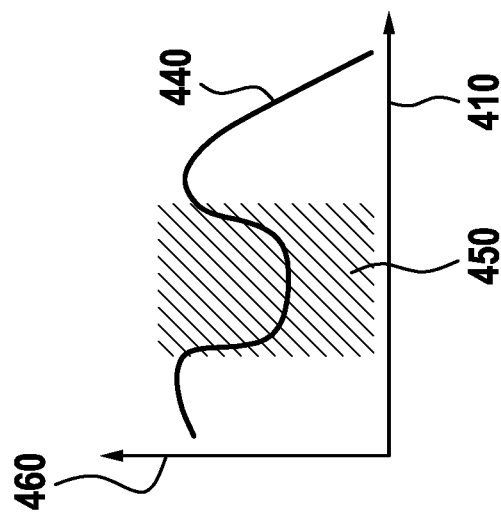
FIG. 4A is a diagram of an illustrative transfer function magnitude in dependence on the frequency for a feedback controller before optimization in accordance with some embodiments.
Figure 4B:
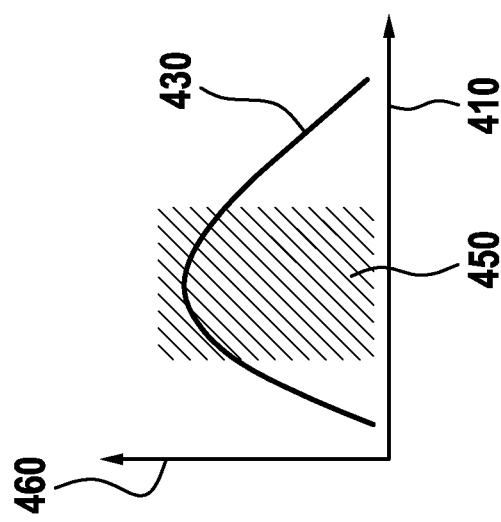
FIG. 4B is a diagram of an illustrative transfer function magnitude in dependence on the frequency for a passenger discomfort weighting filter in accordance with some embodiments.
Figure 4C:
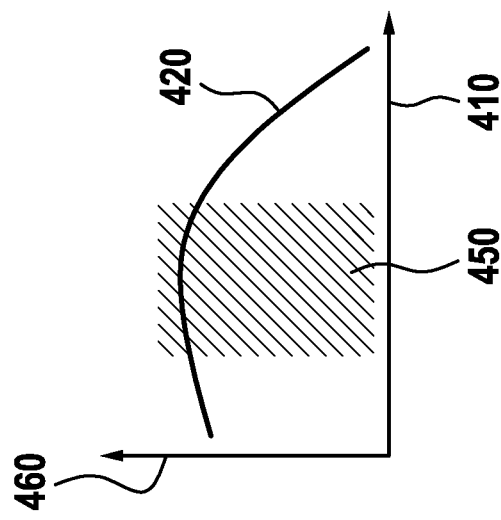
FIG. 4C is a diagram of an illustrative transfer function magnitude in dependence on the frequency for a feedback controller after optimization in accordance with some embodiments.

FIGS. 4A, 4B, and 4C are diagrams of illustrative transfer function magnitudes 460 in dependence on the frequency 410 for a feedback controller before optimization 420, a passenger discomfort weighting filter 430, and a feedback controller after optimization 440, respectively.

FIG. 4A shows a typical transfer function magnitude 420 of a feedback controller (e.g., feedback controller 340 of FIG. 3) before optimization with respect to passenger discomfort. The transfer function magnitude 420 shows a low pass filter characteristic. Thus, the transfer function magnitude 420 is high and relatively constant at low frequencies 410 and decreases with increasing frequencies 410.

FIG. 4B shows a typical transfer function magnitude 430 of a passenger discomfort weighting filter (e.g., passenger discomfort weighting filter 320 of FIG. 3). The transfer function magnitude of a passenger discomfort weighting filter 430 typically has a band pass filter characteristic. Thus, the transfer function magnitude 430 is low at low and at high frequencies 410 and high at mid-level frequencies 410. The area and frequency range with high passenger discomfort sensitivity 450 is highlighted.

Typically, two ranges of frequencies are of special interest in view of human perception leading to a classification into two different kinds of passenger discomfort:

Motions in a very low frequency range from approximately 0.02 Hz to 2 Hz with a peak human sensitivity at approximately 0.15 Hz may lead to kinetosis of the occupants in case of adverse trajectories.

Motions in a low frequency range from approximately 1 Hz to 80 Hz with peak human sensitivity e.g., in vertical direction around 5 Hz may lead to whole-body vibrations of the occupants introduced by contact surfaces such as seat pan, seat backrest and cabin floor for seated persons.

FIG. 4C shows a typical transfer function magnitude 440 of the feedback controller (e.g., feedback controller 340 of FIG. 3) after optimization with respect to passenger discomfort. The transfer function magnitude 440 typically has a band stop filter characteristic. The comfort optimized feedback controller (i.e., transfer function magnitude 440 of FIG. 4C) shows lower magnitudes of a passenger discomfort-aware actuator control signal (e.g., passenger discomfort-aware actuator control signal 145 of FIG. 1 or FIG. 2) in the high passenger discomfort sensitivity area 450 compared to the transfer function magnitude of the feedback controller before optimization (i.e., transfer function magnitude 420 of FIG. 4A), at the cost of higher magnitudes of the passenger discomfort-aware actuator control signal in other frequency regions.

Note that the actual transfer function magnitudes 420, 430, 440 for the feedback controller before optimization 420, the passenger discomfort weighting filter 430, and the feedback controller after optimization 440 may be different from these illustrative examples.

Figure 5:
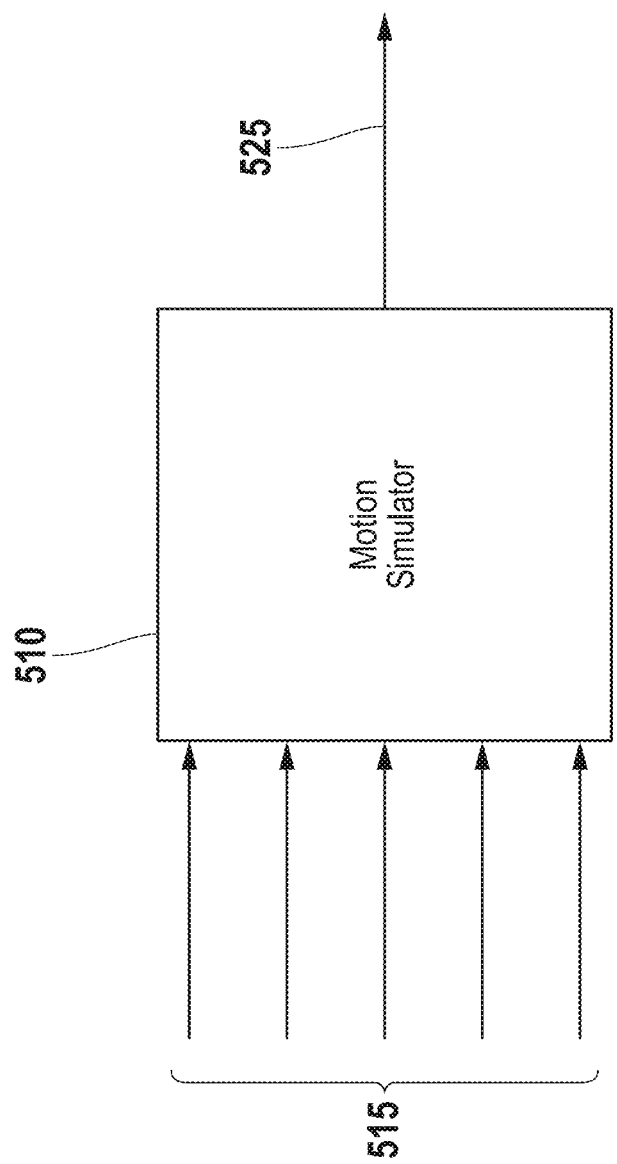
FIG. 5 is a diagram of an illustrative motion simulator for the flight control system design that determines a filter signal based on motion simulations of representative trajectories of the rotary wing aircraft in accordance with some embodiments.

FIG. 5 is a diagram of an illustrative motion simulator 510 for the flight control system design (e.g., flight control system design 300 of FIG. 3) that determines a filter signal 525 based on motion simulations of representative trajectories 515 of a rotary wing aircraft (e.g., the rotary wing aircraft 100 of FIG. 1).

Illustratively, the predetermined filter signal 525 is determined based on motion simulations of the representative trajectories 515 of the rotary wing aircraft with a motion simulator 510 for flight control system design. If desired, the representative trajectories 515 of the rotary wing aircraft may include translational motions (e.g., forward or sideward flight) and/or rotational motions about the yaw, roll, and pitch axis (e.g., yaw axis 107, roll axis 108, and/or pitch axis 109 of FIG. 1).

The motion simulations of the representative trajectories 515 may be performed by motion platform tests. For example, the motion platform tests may use a cable robot simulator that is able to provoke passenger discomfort. If desired, synthesized trajectories based on experimental data from a rotary wing aircraft may be applied to the cable robot simulator.

Preferably, during the test runs, test persons may provide subjective feedback regarding their discomfort, which—in combination with the applied motions to the motion platform—allows to construct passenger discomfort weighting filters (i.e., sensitivity to discomfort as a function of frequency) for the different motions.

Experimental results show that test persons are highly sensitive to rotational motions in view of kinetosis. However, rotational motions are not considered in ISO 2631-1.

If desired, the passenger discomfort weighting filters may be derived by human perception models. Human perception models for kinetosis may be available in literature. Illustratively, the predetermined filter signal from the passenger discomfort weighting filter may be based on a combination of experimental data from human platform tests and human perception models.

According to one aspect, the passenger discomfort weighting filters may be based on weighting filters of whole-body vibrations as described in ISO 2631-1 for reducing whole-body vibrations in gusty flight conditions. Discomfort provoking whole-body vibrations may appear especially at frequencies around 5 Hz which is above the typical bandwidth of kinetosis.

If desired, the passenger discomfort weighting filter may be based on a combination of a kinetosis weighting filter and a whole-body vibration weighting filter. Thereby, the passenger discomfort weighting filter may simultaneously account for kinetosis and whole-body vibrations in the flight control system design (e.g., flight control system design 300 of FIG. 3).

FIG. 6 is a diagram of a flowchart 600 showing illustrative operations that a flight control system (e.g., flight control system 110 of FIGS. 1 and 2) may perform to control a rotary wing aircraft (e.g., rotary wing aircraft 100 of FIG. 1).

During operation 610, the flight control system may use sensors to generate sensor data based on captured motions of the rotary wing aircraft.

For example, the flight control system 110 of FIG. 1 or 2 may use sensors 120 to generate sensor data 125 based on captured motions of the rotary wing aircraft 100.

During operation 620, the flight control system may use motion actuators to induce a translational and/or a rotational movement of the rotary wing aircraft about at least one of a yaw axis, a roll axis, or a pitch axis.

For example, the flight control system 110 of FIG. 1 or 2 may use motion actuators 130 to induce a translational and/or a rotational movement of the rotary wing aircraft 100 about at least one of a yaw axis 107, a roll axis 108, or a pitch axis 109.

During operation 630, the flight control system may use a passenger discomfort-aware control unit to receive the sensor data from the sensors and to generate, based on the sensor data, passenger discomfort-aware actuator control signals for controlling the motion actuators of the rotary wing aircraft, wherein the passenger discomfort-aware actuator control signals are at least suitable for kinetosis reduction or for whole-body vibration reduction in passengers of the rotary-wing aircraft when being applied to the motion actuators.

For example, the flight control system 110 of FIG. 1 or 2 may use a passenger discomfort-aware control unit 140 to receive the sensor data 125 from the sensors 120 and to generate, based on the sensor data 125, passenger discomfort-aware actuator control signals 145 for controlling the motion actuators 140 of the rotary wing aircraft 100, wherein the passenger discomfort-aware actuator control signals 145 are at least suitable for kinetosis reduction or for whole-body vibration reduction in passengers of the rotary-wing aircraft 100 when being applied to the motion actuators 130.

If desired, the flight control system may perform additional operations. For example, a passenger discomfort-aware control unit configuration 700 may configure the passenger discomfort-aware control unit before its use in the flight control system.

FIG. 7 is a diagram of a flowchart showing an illustrative configuration 700 of a passenger discomfort-aware control unit (e.g., passenger discomfort-aware control unit 140 of FIG. 1 or 2) during the design of a flight control system (e.g., flight control system 110 of FIG. 1 or 2).

During operation 710, the passenger discomfort-aware control unit configuration may use a motion simulator to perform motion simulations of representative trajectories of the rotary wing aircraft.

For example, motion simulator 510 of FIG. 5 may be used to perform motion simulations of representative trajectories 515 of the rotary wing aircraft (e.g., rotary wing aircraft 100 of FIG. 1).

If desired, the representative trajectories of the rotary wing aircraft (e.g., rotary wing aircraft 100 of FIG. 1) may include translational motions and rotational motions around the yaw, roll, and pitch axes (e.g., yaw, roll, and pitch axis 107, 108, 109, respectively of FIG. 1) of the rotary wing aircraft.

During operation 720, the passenger discomfort-aware control unit configuration may determine a filter signal based on the motion simulations.

For example, the passenger discomfort-aware control unit configuration may determine filter signal 525 of FIG. 5 based on the motion simulations.

During operation 730, the passenger discomfort-aware control unit configuration may adjust a feedback controller based on an application of the filter signal in a passenger discomfort weighting filter.

For example, the passenger discomfort-aware control unit configuration may adjust feedback controller 340 of FIG. 3 based on an application of the filter signal 525 of FIG. 5 in passenger discomfort weighting filter 320.

If desired, the passenger discomfort-aware control unit configuration may adjust a motion frequency and/or a motion pattern in the feedback controller (e.g., feedback controller 340 of FIG. 3) with the filter signal.

During operation 730, the passenger discomfort-aware control unit configuration may, with the adjusted feedback controller, determine a linear feedback function that minimizes a transfer from the sensor data to control signals that increase a difference of a passenger discomfort index from a reference value, wherein the reference value is indicative of an absence of passenger discomfort.

For example, the passenger discomfort-aware control unit configuration may, with the adjusted feedback controller 340 of FIG. 3, determine a linear feedback function that minimizes a transfer from the sensor data (e.g., sensor data 125 of FIG. 1 or 2) to control signals that increase a difference of a passenger discomfort index 315 from a reference value, whereby the reference value is indicative of an absence of passenger discomfort.

It should be noted that modifications to the above described embodiments are within the common knowledge of the person skilled in the art and, thus, also considered as being part of the present disclosure.

For instance, even though the above described technology of FIGS. 1 to 7 refers to a flight control system for a rotary wing aircraft, it is understood that the control design approach can be extended to all kind of manned aeronautical vehicles using a flight control system, including jet airplanes, spacecraft, VTOL vehicles, etc.

Furthermore, the control design approach can be extended to all kind of manned transportation systems using a motion control system, including cars, trucks, and other land-based vehicles as well as ships, boats, and other water-based vessels.

REFERENCE LIST 100 rotary wing aircraft
101a fuselage
101b tail boom
101c wheel-type landing gear
102 main rotor
102a, 102b rotor blades
102c rotor head
102d rotor mast
103 tail rotor
104 pitch control unit
105 main rotor drive system
106 tail rotor drive system
107 yaw axis
108 roll axis
109 pitch axis
110 flight control system
120 sensor
125 sensor data
130 motion actuator
140 passenger discomfort-aware control unit
145 passenger discomfort-aware actuator control signal
300 flight control system design
315 passenger discomfort index
320 passenger discomfort weighting filter
330 rotary wing aircraft plant
340 feedback controller
345 modeled actuator control signal
355 modeled disturbance input
365 modeled sensor data
410 frequency
420 transfer function magnitude of feedback controller before optimization
430 transfer function magnitude of passenger discomfort weighting filter
440 transfer function magnitude of feedback controller after optimization
450 high passenger discomfort sensitivity area
460 transfer function magnitude
510 motion simulator
515 representative trajectory
525 filter signal
600 method
610, 620, 630 operation
700 operation
710, 720, 730, 740 operation

What is claimed is:

1. A flight control system that is adapted for controlling movements of a rotary wing aircraft, comprising:
   sensors that are configured to generate sensor data based on captured motions of the rotary wing aircraft;
   motion actuators that are adapted for inducing a translational and/or a rotational movement of the rotary wing aircraft about at least one of a yaw axis, a roll axis, or a pitch axis of the rotary wing aircraft; and
   a passenger discomfort-aware control unit that is configured to receive the sensor data from the sensors and to generate, based on the sensor data, passenger discomfort-aware actuator control signals for controlling the motion actuators, wherein the passenger discomfort-aware actuator control signals are at least suitable for kinetosis reduction or for whole-body vibration reduction in passengers of the rotary-wing aircraft when being applied to the motion actuators;
   wherein the passenger discomfort-aware control unit generates the passenger discomfort-aware actuator control signals based on a linear feedback function that minimizes a transfer from the sensor data to control signals that increase a difference of a passenger discomfort index from a reference value, the reference value being indicative of an absence of passenger discomfort; and
   the linear feedback function is determined with a feedback controller that is adjusted based on an application of a predetermined filter signal in a passenger discomfort weighting filter, the predetermined filter signal being determined based on motion simulations of representative trajectories of the rotary wing aircraft with a motion simulator for flight control system design.

2. The flight control system of claim 1, wherein the representative trajectories of the rotary wing aircraft comprise translational motions and rotational motions about the yaw, roll, and pitch axis.

3. The flight control system of claim 1, wherein the predetermined filter signal adjusts a motion frequency in the feedback controller.

4. The flight control system of claim 1, wherein the predetermined filter signal adjusts a motion pattern in the feedback controller.

5. The flight control system of claim 1, wherein the motion actuators include a pitch control unit configured to control collective and cyclic pitch of rotor blades of the rotary wing aircraft for inducing a translational and/or a rotational movement of the rotary wing aircraft about at least one of the yaw axis, the roll axis, or the pitch axis.

6. The flight control system of claim 1, wherein the motion actuators include at least one motion actuator configured to control a drive system of the rotary wing aircraft for inducing a translational and/or a rotational movement of the rotary wing aircraft about at least one of the yaw axis, the roll axis, or the pitch axis.

7. A method of operating a flight control system for a rotary wing aircraft, comprising:
   using sensors to generate sensor data based on captured motions of the rotary wing aircraft;
   using motion actuators to induce a translational and/or a rotational movement of the rotary wing aircraft about at least one of a yaw axis, a roll axis, or a pitch axis of the rotary wing aircraft;
   using a passenger discomfort-aware control unit to receive the sensor data from the sensors and to generate, based on the sensor data, passenger discomfort-aware actuator control signals for controlling the motion actuators, wherein the passenger discomfort-aware actuator control signals are at least suitable for kinetosis reduction or for whole-body vibration reduction in passengers of the rotary-wing aircraft when being applied to the motion actuators; and configuring the passenger discomfort-aware control unit before using the passenger discomfort-aware control unit in the flight control system;

wherein configuring the passenger discomfort-aware control unit comprises:

using a motion simulator to perform motion simulations of representative trajectories of the rotary wing aircraft;

determining a filter signal based on the motion simulations;

adjusting a feedback controller based on an application of the filter signal in a passenger discomfort weighting filter; and with the adjusted feedback controller, determining a linear feedback function that minimizes a transfer from the sensor data to control signals that increase a difference of a passenger discomfort index from a reference value, the reference value being indicative of an absence of passenger discomfort.

8. The method of claim 7, wherein the representative trajectories of the rotary wing aircraft comprise translational motions and rotational motions around the yaw, roll, and pitch axes of the rotary wing aircraft.

9. The method of claim 7, wherein adjusting the feedback controller further comprises:

with the filter signal, adjusting a motion frequency in the feedback controller.

10. The method of claim 7, wherein adjusting the feedback controller further comprises:

with the filter signal adjusting a motion pattern in the feedback controller.

11. The method of claim 7, wherein using motion actuators to induce a translational and/or a rotational movement of the rotary wing aircraft about at least one of a yaw axis, a roll axis, or a pitch axis includes using a pitch control unit configured to control collective and cyclic pitch of rotor blades of the rotary wing aircraft to inducing the translational and/or the rotational movement of the rotary wing aircraft about at least one of the yaw axis, the roll axis, or the pitch axis.

12. The method of claim 7, wherein using motion actuators to induce a translational and/or a rotational movement of the rotary wing aircraft about at least one of a yaw axis, a roll axis, or a pitch axis includes using at least one motion actuator configured to control a drive system of the rotary wing aircraft to induce the translational and/or the rotational movement of the rotary wing aircraft about at least one of the yaw axis, the roll axis, or the pitch axis.

* * * * *